United States Patent [19]

Nawojski et al.

[11] Patent Number: 4,712,438
[45] Date of Patent: Dec. 15, 1987

[54] VARIABLE SPEED CONTROL

[76] Inventors: Julius W. Nawojski, 38148 Medville, Sterling Heights, Mich. 48077; Walter Nawojski, VA 35 FPO, New York, N.Y. 09501-6206

[21] Appl. No.: 729,487
[22] Filed: May 1, 1985
[51] Int. Cl.$^4$ .............................................. G05G 7/04
[52] U.S. Cl. .......................................... 74/63; 74/518
[58] Field of Search ............................ 74/63, 516, 518
[56] References Cited

U.S. PATENT DOCUMENTS 3,501,972 3/1970 Morrow et al. ...................... 474/95
4,179,953 12/1979 Hanada et al. ..................... 74/750 B
4,506,559 3/1985 Francke et al. ....................... 474/95

FOREIGN PATENT DOCUMENTS 381826 10/1973 U.S.S.R. .................................. 74/63

Primary Examiner—Allan D. Hermann

[57] ABSTRACT

A mechanical mechanism is incorporated with two slotted discs -27- and -25- with two levers -14- and -16- which are inserted in the slots separating discs -27- and -25- to the length of the tips of levers -14- and -16-. Shifting the levers through the movement of activating shaft -2- which in turn moves impeller -7- creating, under the power of the coaster sprocket drive, a variation of speeds, though applied pressure. Stationary disc -27- being integrated with the bicycle retaining cylinder and floating disc -25- being free of the retaining cylinder will now be compelled only by the revolution of speed transmitted by the coaster sprocket drive. the structure and components of this invention are totally enclosed, minimizing difficulties in operation as one may shift into different speeds without flaws.

6 Claims, 5 Drawing Figures

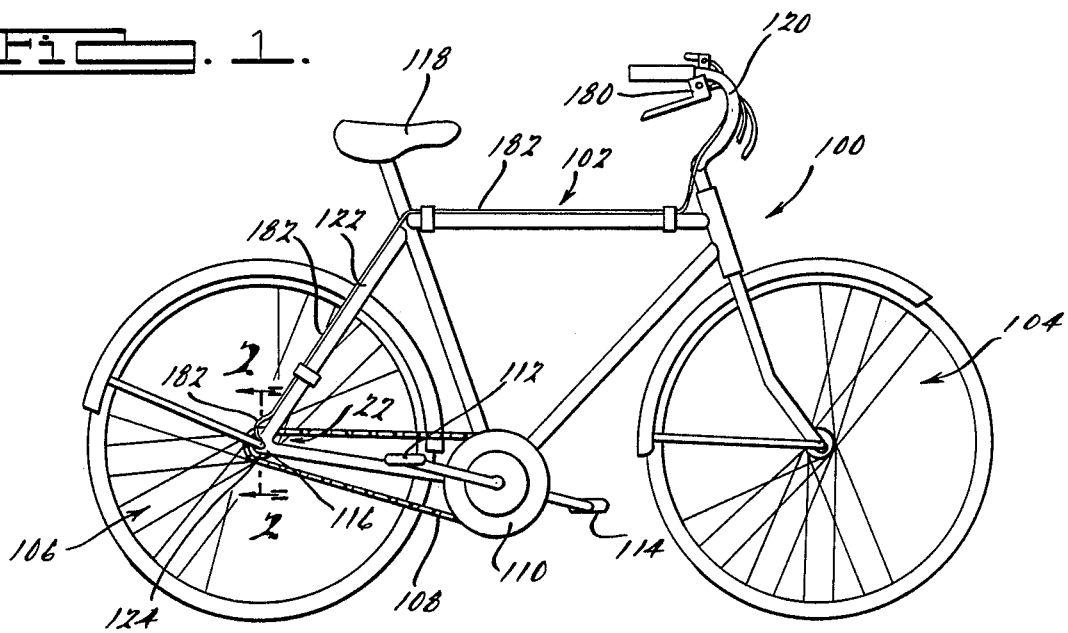
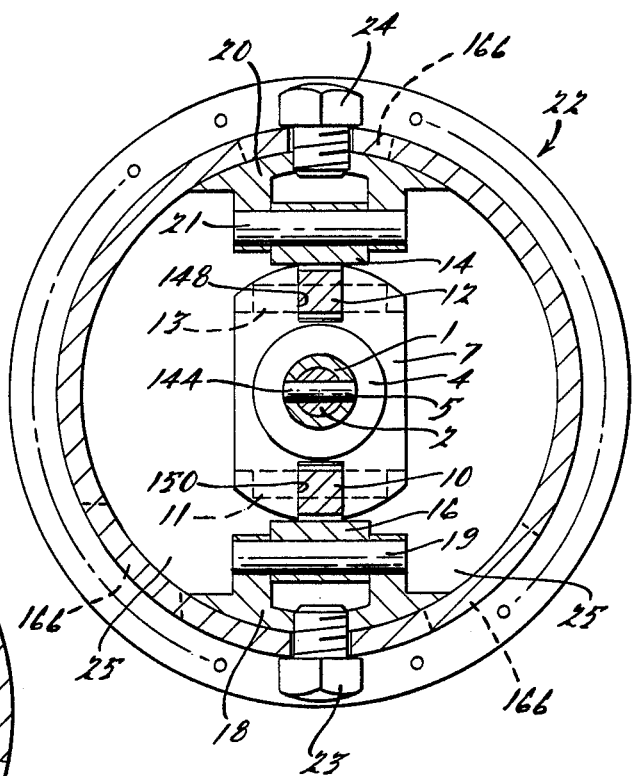
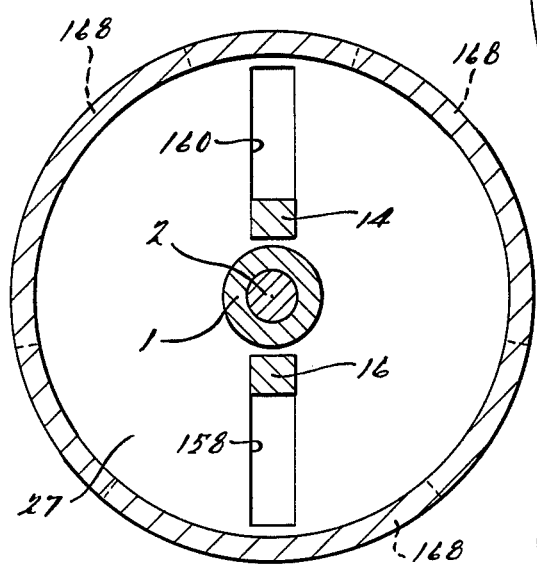
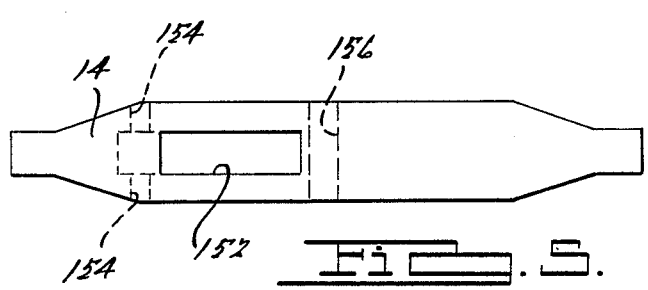

VARIABLE SPEED CONTROL

BACKGROUND OF THE INVENTION

Be it known that we Julius Nawojski and Walter Nawojski are citizens of the U.S. and residents of Sterling Heights in the County of Macomb and the state of Michigan have invented a new and useful improvement in a two wheeled bicycle. It is known that the bicycle has a spocket and chain and may include a cluster of gears to drive the rear wheel. In order to change speeds the chain must part from one gear in such a cluster to the next. This invention is directed to a novel matter of maintaining and minimizing complication in operation. The invention can be used with a single speed or multiple speed bicycle.

The basic material of the variable torque control will consist of metal and plastic. The variable torque control operates through movement of a rod at the bicycle hub, which is fixed inside the axle arrangement. The rod when activated, moves two arms or levers with rockers inside the hub selecting torque position.

SUMMARY OF THE INVENTION

A totally enclosed torque change in the rear wheel of the bicycle hub will keep the mechanism free of road dust. The chain to the rear wheel will not falter, because of a direct drive to the mechanism being in the body of the wheel hub.

BRIEF DESCRIPTION OF THE DRAWINGS

FIG. 1 is an elevated view of a bicycle with which the present invention may be used;

FIG. 3 is a vertical sectional view along the line 3—3 of FIG. 2;

FIG. 4 is a vertical sectional view along the line 4—4 of FIG. 2; and

FIG. 5 is an elevated view of a rocker of FIG. 2.

DESCRIPTION OF THE PREFERRED EMBODIMENT

Figure 2:
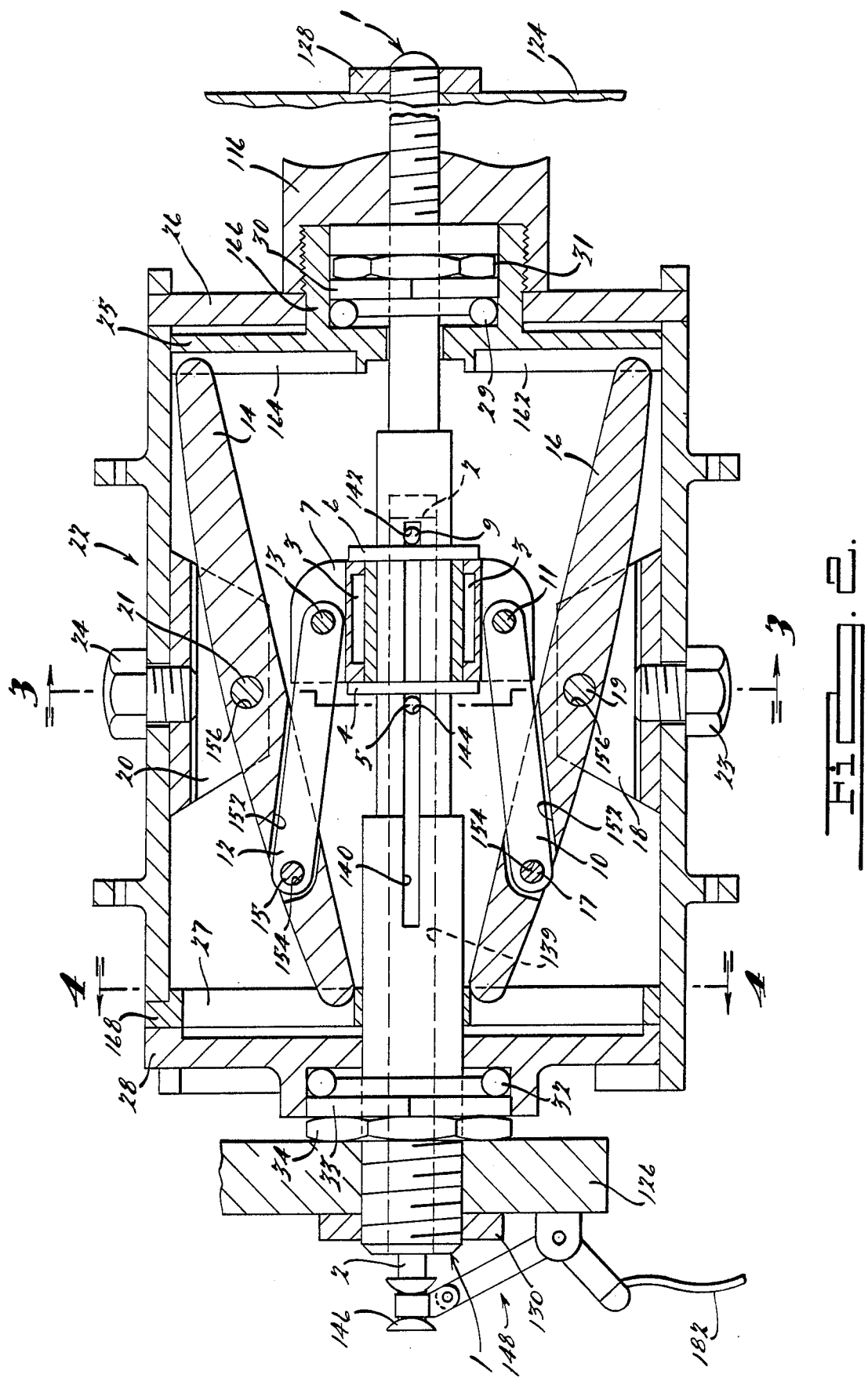
FIG. 2 is a vertical cross-sectional view of the rear hub of the bicycle of FIG. 1.

A bicycle 100 is illustrated in FIG. 1 having a frame 102 supporting front 104 and rear 106 wheels. A drive chain 108 extends from a first sprocket 110, to which pedals 112 and 114 are attached, to a second sprocket 116 attached to the rear wheel 106. The bicycle 100 has a conventional seat 118 and handlebars 120.

The rear of the frame 102 has a fork 122 within which the rear wheel 106 rotates which includes two members 124 and 126 which attach (FIG. 2) to a rear axle 1 of the rear wheel 106. The axle 1 is secured to the members 124 and 126 by a pair of nuts 128 and 130, respectively. Member 124 has both width and length portions broken away in FIG. 2. The axle shaft is stationary and does not turn. The axle is threaded at both ends and has hollow bore 139 along ¾ of the way from the large end. The length of the axle in the disclosed embodiment is six inches. The axle has a slot 140 which continues through the diameter of the axle, as shown in FIG. 2. A rod 2 is inserted into the axle shaft 1 with two holes 142 and 144 through the diameter and a knob 146 at the end of the rod 2 as shown in FIG. 2. This knob 146 is for attaching a pivoted clip 148 to move the rod back and forth internally in the axle. Needle bearings 3 are shown in FIG. 2, as well as a bushing 4, a pin 5, a washer 6, and an impeller 7 that slides on the axle shaft 1 about a half inch and revolves on the axle shaft 1. The needle bearings 3 are installed in the impeller 7, the bushing 4 is installed in the impeller 7, the pin 5 is inserted through the slot 140 of the axle 1 and through hole 144 in rod 2 in centered position. With following washer 6, impeller 7 is set in place along with bushing 4 and needle bearings 3 via washer 8 and pin 9 in hole 142 to hold impeller 7 in place between the two pins 5 and 9. Impeller 7 is able to revolve around axle shaft 1 and is able to slide back and forth with the movement of rod 2. Impeller 7 is slotted as shown on FIG. 3.

10 and 12 are two identical push rods inserted into the slots 148 and 150 of impeller 7 and anchored with pin 11 and pin 13 respectively as shown on FIG. 3. Pins 11 and 13 have grooves at one end that lock into place when push rods 10 and 12 are forced to the necessary length and also have grooves to compensate for replacement of a nut and bolt. Push rods 10 and 12 are secured to rockers 14 and 16 as shown in FIG. 3 with drift pins 15 and 17. Rockers 14 and 16 being both identical, each has a slot 152 as shown in FIG. 5. In this respect, push rods 10 and 12 slip into rockers 14 and 16. Each rocker has two holes 154 and 156 as shown in FIGS. 2 and 5, of which one hole is centered and one hole is towards the end. As shown in FIG. 2, rockers 14 and 16 are able to pivot back and forth when secured in elements 18 and 20 via drift pins 19 and 21. Elements 20 and 18 are contoured with the diameter of hub 22, inserted into hub 22, and secured with nuts 23 and 24 as shown on FIG. 2. Plate 27 as shown on FIG. 4 is inserted into hub 22 through the axle shaft 1. The two rockers 16 and 14 are inserted through the two slots 158 and 160 in plate 27 and the three prongs on plate 27 interlock with hub 22. Ball bearing plate 28 also with three prongs is inserted through axle shaft 1 and interlocks with hub 22. On the opposite end of hub 22, plate 25, also having two slots 162 and 164 and a ball bearing retainer 166 as shown on FIG. 2, slips onto axle shaft 1 with the two rockers 16 and 14 inserted through the two slots 162 and 164 of ball bearing retainer plate 25. Plate 26 as shown on FIG. 2 also with three holding prongs 166 (FIG. 3), slides over ball bearing retainer plate 25 and interlocks with hub 22. Both ends of axle shaft 1 are followed with ball bearings 29 and 32. Ball bearing retainers 30 and 33 are secured with lock nuts 31 and 34. A coaster sprocket 116, already being part of the bicycle, is fitted by threads onto ball bearing retainer plate 25. When the coaster sprocket 116 is revolved and ball bearing retainer plate 25 is neutral and floating on axle shaft 1 from hub 22, force is applied to rockers 14 and 16. In conjunction with the rotation of ball bearing retainer plate 25, rockers 14 and 16 will also rotate plate 27 and hub 22, both being secured together as one unit through the force of action from the coaster sprocket 116. When rockers 14 and 16 (centered on elements 18 and 20 and protruding through the slots of ball bearing retainer plate 25 and plate 27) are shifted by moving rod 2 inward, the rockers 14 and 16 will close towards the axle 1 to rotate plate 27 and hub 22 in a low torque ratio. The opposite effect of high torque ratio on hub 22 is achieved by moving rod 2 outward causing rockers 14 and 16 to spread open on plate 27 and close on ball bearing retainer plate 25. The torque ratio will either lessen or increase the difficulty of pedalling the bicycle as desired by the rider of the bicycle 100. The rider of the bicycle would close a control lever 180 mounted on the handlebars to pull a cable 182 attached between the lever 180 and the pivoted clip 148. This action pulls the rod 2 out to increase the torque ratio. The control level 180 is then returned upon release to an at rest position by a conventional spring mechanism (not shown) to retun the rod 2 to its at rest position.

While it will be apparent that the preferred embodiment of the invention disclosed is well calculated to provide the advantages and features above stated, it will be appreciated that the invention is susceptible to modification, variation, and change without departing from the proper scope of fair meaning of the subjoined claims.

We claim:

1. In a bicycle hub for a bicycle wheel, including axle means and a sprocket secured to said axle means, a variable force mechanism comprising means disposed within the hub for connecting said axle means to said hub, including transmission means comprising at least one rocker arm pivotally secured to said axle means, slideably secured to said hub, and movable from a first position to a second position wherein disposition of said transmission means in said second position provides a greater resistance to rotation of said sprocket than disposition of said transmission means in said first position; and means for controlling the movement of said transmission means from said first position to said second position.

2. A mechanism in accordance with claim 1, wherein said transmission means includes an impeller secured by guide means to move with said guide means along the length of said axle means.

3. A mechanism in accordance with claim 2, wherein said axle means includes a slot and said guide means move within said slot.

4. A mechanism in accordance with claim 1, wherein said control means comprises a rod axially movable within a bore disposed within said axle means.

5. A mechanism in accordance with claim 3, wherein said transmission means includes an impeller secured by at least one pin to move with said guide means along the length of said axle means.

6. A mechanism in accordance with claim 5, wherein said axle means includes a slot and said at least one pin moves within said slot.

* * * * *